L. J. H. NEWMAN.
GATE LATCH.
APPLICATION FILED MAR. 24, 1919.

1,307,789.

Patented June 24, 1919.

Inventor
L. J. H. Newman

By D. Swift & Co.

Attorneys

UNITED STATES PATENT OFFICE.

LINWOOD J. H. NEWMAN, OF BURKE, VIRGINIA.

GATE-LATCH.

1,307,789.   Specification of Letters Patent.   Patented June 24, 1919.

Application filed March 24, 1919. Serial No. 284,763.

*To all whom it may concern:*

Be it known that I, LINWOOD J. H. NEWMAN, a citizen of the United States, residing at Burke, in the county of Fairfax, State of Virginia, have invented a new and useful Gate-Latch; and I do hereby declare the following to be a full, clear, and exact description of the invention, such as will enable others skilled in the art to which it appertains to make and use the same.

The invention relates to latches for various types of swinging gates, that kind of gates which may be opened from either side and has for its object to provide a latch of this character, wherein it will be impossible for animals to raise the latch and push the gate to an open position.

A further object is to provide a latch for farm gates, wherein the free edge of the gate is normally maintained in a latched or closed position by a bifurcated member which receives the edge of the gate, said bifurcated member being pivoted horizontally on a keeper plate secured to the gate post and to provide the keeper plate with integral flanges, which engage the sides of the pivoted bifurcated member for holding the same in position between the flanges, thereby locking the gate the pivotal point of the bifurcated member being loose so that the sides of the bifurcated member may be raised so as to allow the member to be raised far enough to clear the flanges of the keeper plate when the gate is being opened inwardly or outwardly.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
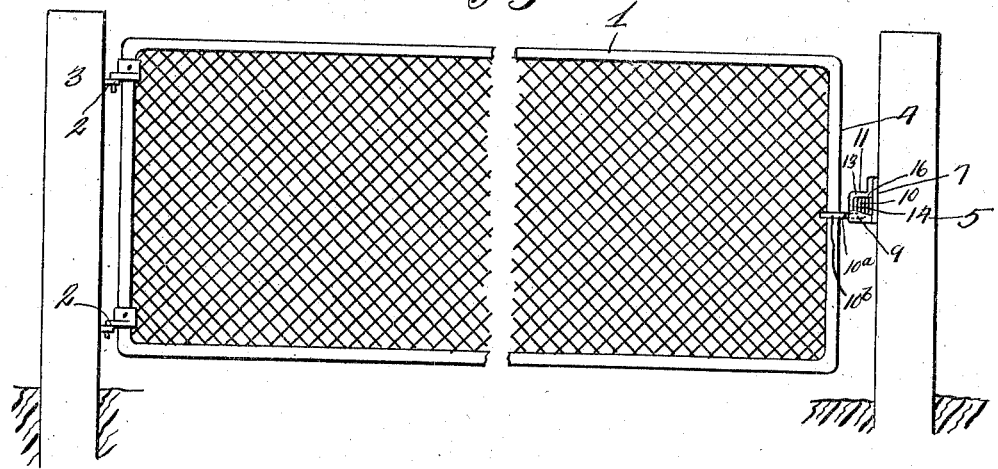
Figure 1 is a front elevation of a gate, showing the latch applied thereto.
Figure 2:
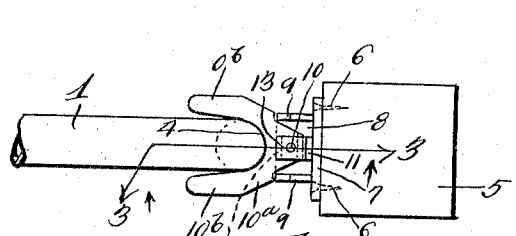
Fig. 2 is a top plan view of the latch, gate post and free end of the gate.
Figure 3:
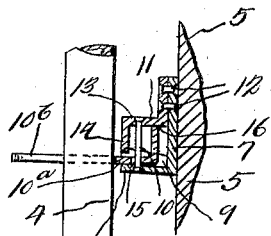
Fig. 3 is a sectional view taken on line 3—3 of Fig. 2.
Figure 4:
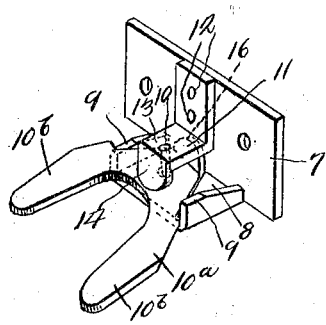
Fig. 4 is a perspective view of the latch, showing the bifurcated member twisted on its pivotal point so that the same may be pivoted so as to clear the flange of the keeper plate.
Figure 5:
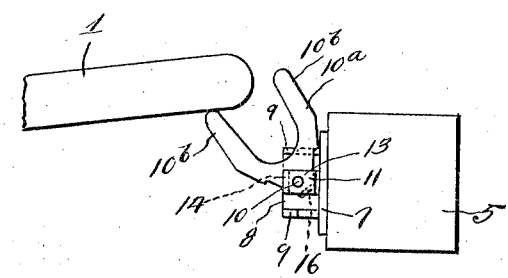
Fig. 5 is a top plan view showing the edge of the gate in its position when leaving the bifurcation of the bifurcated member.

Referring to the drawings the numeral 1 designates a conventional form of gate which may be of any construction, however it is preferably a double swinging gate, that is a gate that may be opened so that the gate will swing inwardly or outwardly. One edge of the gate is hingedly connected as at 2 to the gate post 3 and its free edge 4 is adapted to swing in a near position to a gate post 5. Secured by means of screws 6, to the post 5, is a keeper plate 7 the lower edge of which is provided with a right angular portion 8, the edges of which are provided with right angled flanges 9. Pivotally mounted on a pin 10 which passes through the portion 8 is a bifurcated member 10ª, the pin having its upper end riveted in a bracket 11 which is riveted as at 12 to the plate 7. The bracket 11 is provided with a horizontal portion 13 and a right angled portion 14, which extends downwardly and has its round end disposed over the bifurcated member 10ª.

The bifurcated member 10ª is loosely pivoted as at 15 so as to allow the side twisting of the member when it is desired to open the gate, this side twisting being necessary, so that the member 10ª will clear the flanges 9 as the gate is being opened or closed, however the portion 14 prevents the member 10ª from being raised high enough to clear the flanges without a twisting of the member. A right angled integral arm is provided at the rear end of the member 10ª and has its upper end so disposed as to engage the portion 13 of the angular bracket 11, when the bifurcated member is in a horizontal position and the gate is locked, however the right angled portion 8 extends slightly upwardly, thereby allowing the member 10ª to be raised on its loose pivotal point 15 until it comes into engagement with the round end of the arm 14 so that a further twisting of member 10ª will allow the same to clear the flanges 9 as the gate is opened.

When it is desired to open the gate, the operator grasps one of the arms 10ᵇ and raises the same, this raising action will cause a slight twisting of the member 10ª so that the same will be in a position whereby as a pull or push on the gate as the case may be, will cause the member 10ª to pivot on the pin 10 so that the member 10ª will clear the flanges 9. The closing of the gate is accomplished by the edge 4, of the gate engaging the arms 10ᵇ which will pivot the member 10ᵃ on its pivotal point until the bifurcated member 10ᵃ drops between the flanges 9 which will again lock the gate.

It will be seen that if an animal tries to open the gate, it will raise one of the arms 10ᵇ, but when it attempts to push the gate open the member 10ᵃ will be in close engagement with the flange 9 on the other side of the gate, therefore it will be impossible for the gate to be forced or pushed open by the animal. This action would be the same no matter which side of the gate the animal may be on when he attempts to open the same. It will also be noted that vehicles that approach the gate may come close to the same, for the reason that no matter which side they may be on, the gate can be opened from them.

The invention having been set forth, what is claimed as new and useful is:—

A gate latch comprising an angular keeper plate secured to a post, said keeper plate being provided with a horizontal arm, said horizontal arm having upstanding flanges, a bifurcated horizontally loosely pivoted gate engaging member carried by the arm and having an upstanding arm at its rear end in engagement with a bracket carried by the keeper plate so as to limit the downward movement of the outer end of the bifurcated gate engaging member and an arm carried by the bracket overlying the bifurcated member and limiting its upward movement and causing the bifurcated member to twist as either side thereof is raised and positioned so that as the gate is moved the bifurcated member will clear the flanges of the arm of the keeper plate.

In testimony whereof I have signed my name to this specification in the presence of two subscribing witnesses.

LINWOOD J. H. NEWMAN.

Witnesses:
 WELZON M. FARR,
 RUTH A. MITCHELL.

Copies of this patent may be obtained for five cents each, by addressing the "Commissioner of Patents, Washington, D. C."